(12) United States Patent
Oshima et al.

(10) Patent No.: US 8,727,155 B2
(45) Date of Patent: May 20, 2014

(54) TWO-PIECE CAN BODY MADE OF LAMINATED STEEL SHEET, AND METHOD OF PRODUCING THE TWO-PIECE CAN BODY

(71) Applicant: JFE Steel Corporation, Tokyo (JP)

(72) Inventors: Yasuhide Oshima, Chiba (JP); Hiroki Iwasa, Fukuyama (JP); Yoshihiko Yasue, Fukuyama (JP); Yuka Nishihara, Chiba (JP); Katsumi Kojima, Fukuyama (JP); Hiroshi Kubo, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 13/723,957

(22) Filed: Dec. 21, 2012

(65) Prior Publication Data

US 2013/0119057 A1 May 16, 2013

Related U.S. Application Data

(62) Division of application No. 12/311,297, filed as application No. PCT/JP2007/071266 on Oct. 25, 2007, now abandoned.

(30) Foreign Application Priority Data

Oct. 27, 2006 (JP) .................................. 2006-291879

(51) Int. Cl.
*B21D 51/26* (2006.01)
(52) U.S. Cl.
USPC .......................... 220/4.01; 428/458; 72/379.4
(58) Field of Classification Search
USPC .......................... 428/458; 220/4.01; 72/379.4
See application file for complete search history.

(56) References Cited

U.S. PATENT DOCUMENTS

| 4,452,374 | A | 6/1984 | Hitchcock et al. |
| 2007/0036995 | A1* | 2/2007 | Suzuki et al. ................. 428/458 |
| 2010/0000632 | A1 | 1/2010 | Oshima et al. |

FOREIGN PATENT DOCUMENTS

| JP | 54-141886 | A |   | 11/1979 |
| JP | 01299718 | A | * | 12/1989 |
| JP | 03-098844 | A |   | 4/1991 |
| JP | 03098844 | A | * | 4/1991 |
| JP | 04-091825 | A |   | 3/1992 |
| JP | 07-106394 | B2 |  | 11/1995 |
| JP | 10-315389 | A |   | 12/1998 |
| JP | 2004-148324 | A | | 5/2004 |

* cited by examiner

*Primary Examiner* — Kelechi Egwim
(74) *Attorney, Agent, or Firm* — Holtz Holtz Goodman & Chick, P.C.

(57) ABSTRACT

A can body for a two-piece can made of a laminated steel sheet, the laminated steel sheet containing a steel sheet and a copolyethylene terephthalate resin layer containing at least hyone member selected from the group consisting of isophthalic acid and cyclohexane dimethanol as a copolymer component in a proportion of 5 to 20 mol %, and having a crystallization temperature of 120° C. to 140° C. on at least one side of the steel sheet; and satisfying the following relationships: $r_1 \leq r$, $0.1 \leq r_1/R \leq 0.25$, and $1.5 \leq h/(R-r) \leq 4$, wherein $r_1$ represents the minimum radius of the can body, r represents the maximum radius of the can body, h represents the height of the can body, and R represents the radius of the laminated steel sheet having a circular shape before shaping whose weight is the same as that of the can body. The can body has a high strain level, and does not suffer from delamination and breakage of the resin layer.

9 Claims, 1 Drawing Sheet

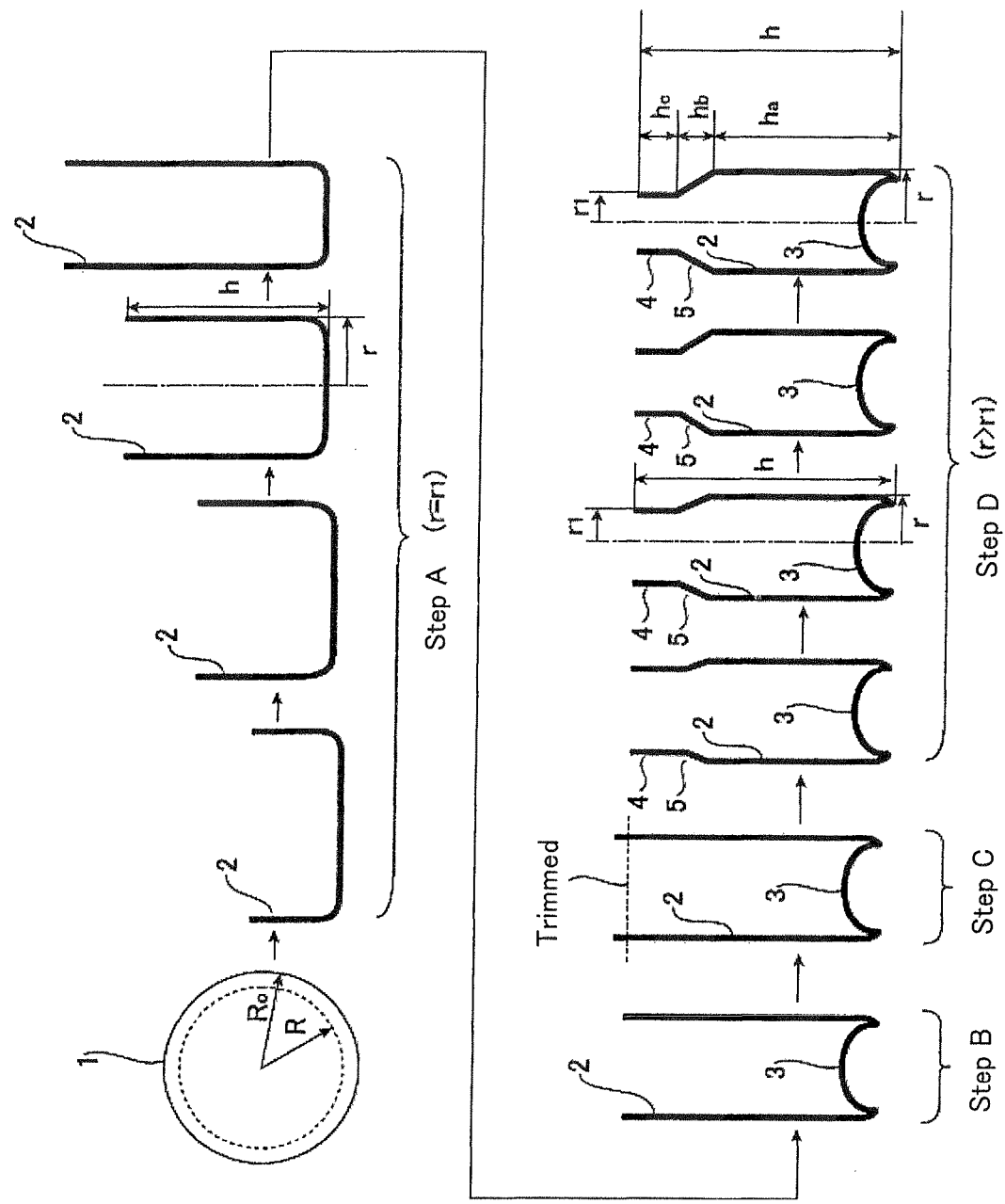

TWO-PIECE CAN BODY MADE OF LAMINATED STEEL SHEET, AND METHOD OF PRODUCING THE TWO-PIECE CAN BODY

CROSS-REFERENCE TO RELATED APPLICATIONS

This application is a divisional application of application Ser. No. 12/311,297 filed Mar. 25, 2009, which is the United States national phase application under 35 USC 371 of International application PCT/JP2007/071266 filed Oct. 25, 2007. The entire contents of each of application Ser. No. 12/311,297 and International application PCT/JP2007/071266 are hereby incorporated by reference herein.

TECHNICAL FIELD

The present invention relates to a laminated steel sheet for two-piece can bodies, two-piece can bodies made of the laminated steel sheet, and a method of producing the two-piece can bodies. More specifically, the present invention relates to a laminated steel sheet for can bodies of two-piece cans having a high strain level, such as aerosol cans, a method of producing two-piece can bodies using the laminated steel sheet, and the obtained two-piece can bodies.

BACKGROUND ART

In general, metal cans are roughly classified into two-piece cans and three-piece cans. Two-piece cans refer to cans formed of two parts, namely, of a can body integrally formed with a can bottom and a lid. Three-piece cans refer to cans formed of three parts, namely, a can trunk, a top lid, and a bottom lid. The can body of a two-piece can (sometimes abbreviated as "two-piece can body") has no seam (welded part) so that it gives aesthetically pleasing appearance. However, the two-piece can' aesthetically pleasing requires a high strain level. Since the can trunk of a three-piece can has a seam, it is inferior, in appearance to the two-piece can. The three-piece can, however, generally requires only a low strain level. Therefore, there is a tendency that two-piece cans have often been used for small-sized high-quality articles and three-piece cans have often been used for large-sized low-priced articles in the market.

As a metal base material for two-piece can bodies having a high degree of drawing and having a high degree of stretching in the height direction of the cans (hereinafter sometimes simply referred to as "having a high strain level"), such as aerosol cans, among two-piece cans, an expensive thick aluminum sheet is generally used, and steel sheet raw materials, such as an inexpensive thin tinplate or tin-free steel, are rarely used. The reason is that since the two-piece aerosol can has a very high strain level, a high strain processing, such as drawing or DI, is difficult to apply to steel sheets, and in contrast, soft metallic materials, such as aluminum, can be subjected to impact shaping.

Under such circumstances, it is industrially very important to produce a can body of the two-piece can bodies having a high strain level using an inexpensive, thin, but high-strength steel sheet material, such as tinplate or tin-free steel.

In contrast, with respect to usual two-piece cans having a low strain level, techniques of producing the usual two-piece can by drawing or DI processing using resin-coated steel sheets (hereinafter referred to as "laminated steel sheets") as a raw material have been conventionally known.

As a resin of covering a laminated steel sheet used for production of such a two-piece can body having a low strain level, polyester is generally used. In particular, ionomer compound materials containing, as a main phase, polyethylene terephthalate, an ethylene terephthalate-isophthalate copolymer, an ethylene terephthalate-butylene terephthalate copolymer, and saturated polyester are mentioned. The above-mentioned polyesters are designed according to methods of producing a two-piece can body having a low strain level, and are suitable for the application. However, no investigation has been conducted on a method of producing a can body that requires neck-in processing having a high strain level after drawing as in two-piece aerosol cans, for example.

Patent Documents 1 to 3 disclose drawing and DI processing techniques for resin-coated metal sheets. However, any techniques disclosed therein are directed toward can bodies having a low strain level, such as beverage cans and food cans. Specifically, techniques are disclosed in which, in production of two-piece cans having a low strain level, internal stress caused by processing is relieved by performing heat treatment after the processing or the orientation of resin is positively promoted.

Patent Documents 2 and 3 disclose performing heat treatment in an intermediate or final stage while aiming at preventing delamination of a resin layer or providing barrier properties after processing. More specifically, Patent Document 2 proposes heat treatment using an oriented thermoplastic resin for the purpose of relieving internal stress and promoting oriented crystallization. The heat treatment has generally been used for beverage cans. Moreover, Patent Document 2 discloses that the heat treatment is preferably conducted to a redrawn cup at or below a temperature at which a coated resin is sufficiently crystallized (at the melting point or 5° C. lower than the melting point). However, considering the description of Examples, it is revealed that only cans having a low strain level are targeted.

Moreover, Patent Document 3 discloses an example in which a resin formed of saturated polyester and an ionomer compound is provided on a coating layer, and then DI processing is performed. Patent Document 3 describes a processing method in which heat treatment is performed after drawing, and then DI processing, necking, and flanging are performed. However, considering the description of Examples, it is revealed that only cans having a low strain level are targeted similarly as in Patent Document 2.

Patent Documents 4 and 5 disclose methods for relieving internal stress by performing heat treatment on a can principally at or above the melting point of a resin after shaping the can. However, the strain level of the obtained can body is still low considering the specification and the description of Examples.

Patent Document 1: Japanese Examined Patent Application Publication No. 7-106394
Patent Document 2: Japanese Patent No. 2526725
Patent Document 3: Japanese Unexamined Patent Application Publication No. 2004-148324
Patent Document 4: Japanese Examined Patent Application Publication No. 59-35344
Patent Document 5: Japanese Examined Patent Application Publication No. 61-22626

More specifically, hitherto, methods of producing high strain bodies of two-piece cans, such as aerosol cans, using a laminated steel sheet have never been disclosed.

The present inventors have attempted to produce high strain two-piece can bodies by shaping a circular laminated steel sheet into a cylindrical form having a bottom by DI processing, and then subjecting a portion around an opening thereof to neck-in processing. Then, a resin layer is delaminated and broken. These phenomena are problems peculiar to high-strain shaping, and heat treatment is apparently effective for overcoming the problems. However, heat treatment before or after shaping in conventional findings is not enough for overcoming the problems, and delamination of a resin layer has not been prevented in a high strain level area. Thus, even when prior art techniques have been simply applied to production of can bodies of high strain two-piece cans, the problem of delamination of a resin layer has not been overcome. Moreover, another problem such that processability of a resin layer is deteriorated at steps after a heat treatment step has arisen.

The present invention has been made under the above-described circumstances, and aims to provide a laminated steel sheet suitable as a raw material for two-piece aerosol cans which are free from delamination and breakage of a resin layer, a method of producing a two-piece can body, and a two-piece can body.

DISCLOSURE OF INVENTION

The present invention provides a laminated steel sheet for a can body of a two-piece can, containing: a copolyethylene terephthalate resin layer containing at least one member selected from the group consisting of isophthalic acid and cyclohexane dimethanol as a copolymer component in a proportion of 5 to 20 mol % and having a crystallization temperature of 120° C. to 140° C. on at least one side of a steel sheet; and satisfying the following relationships of $r_1 \leq r$, $0.1 \leq r_1/R \leq 0.25$, and $1.5 \leq h/(R-r) \leq 4$, wherein $r_1$ represents the minimum radius of the can body, r represents the maximum radius of the can body, h represents the height of the can body, and R represents the radius of the laminated steel sheet having a circular shape before shaping whose weight is the same as that of the can body.

It is preferable that the plane orientation coefficient of the copolyethylene terephthalate resin layer be 0.04 or lower.

Moreover, the present invention provides a method of producing a can body of a two-piece can, including a step of shaping, in multiple steps, a circular sheet of any one of the above-described laminated steel sheets into a formed body satisfying the following relationships of $r_1 \leq r$, $0.1 \leq r_1/R \leq 0.25$, and $1.5 \leq h/(R-r) \leq 4$, wherein $r_1$ represents the minimum radius of the can body, r represents the maximum radius of the can body, h represents the height of the can body, and R represents the radius of the laminated steel sheet having a circular shape before shaping whose weight is the same as that of the can body.

In the production method of the can body, it is preferable to heat the formed body obtained in the middle of the multiple steps at least once at a temperature ranging from 150° C. or higher to a melting point of the copolyethylene terephthalate resin or lower. Moreover, in the production method of the can body, it is more preferable to carry out the heat treatment when the formed body obtained in the middle of the multiple steps satisfies the following relationships of $r_1 \leq r$, $0.2 \leq r_1/R \leq 0.5$, and $1.5 \leq h/(R-r) \leq 2.5$, wherein $r_1$ represents the minimum radius of the can body, r represents the maximum radius of the can body, h represents the height of the can body, and R represents the radius of the laminated steel sheet having a circular shape before shaping whose weight is the same as that of the can body.

The present invention also provides a can body of a two-piece can produced by any one of the above-described production methods.

Furthermore, the present invention provides a laminated steel sheet for a can body of a two-piece can satisfying the following relationships of $r_1 \leq r$, $0.1 \leq r_1/R \leq 0.25$, and $1.5 \leq h/(R-r) \leq 4$, wherein h represents the height of the can body, r represents the maximum radius of the can body, $r_1$ represents the minimum radius of the can body, and R represents the radius of the laminated steel sheet having a circular shape before shaping whose weight is the same as that of the can body, the laminated steel sheet containing a polyester resin layer on at least one side and the polyester resin layer containing terephthalic acid and ethylene glycol as a main polymer component and at least one member of isophthalic acid and cyclohexane dimethanol as a copolymer component in a proportion of 5 to 20 mol % and having a crystallization temperature of 120 to 140° C.

BRIEF DESCRIPTION OF DRAWINGS

FIG. 1 is a view illustrating one embodiment of a method of producing a two-piece can body of the present invention.

BEST MODES FOR CARRYING OUT THE INVENTION

Hereinafter, the present invention will be described in more detail.

The present invention is directed to a can body of a two-piece can. In particular, the present invention is preferably used for a can body of a two-piece can having a high strain level, such as an aerosol can. Then, a two-piece can body intended by the present invention will be described first.

FIG. 1 is a view illustrating one embodiment of a method of producing a two-piece can body of the present invention. FIG. 1 illustrates a step involving drawing (including DI processing) a circular blank 1 formed of a resin-laminated steel sheet into a formed body having a bottom, and subjecting the surrounding region of an opening of the formed body to neck-in processing to thereby form a two-piece can in which the diameter of the surrounding region of an opening of the formed body has been reduced. The "circular" used herein may be any shape that can be subjected to drawing, DI processing, neck-in processing, and/or flanging, and is not limited. Thus, a resin-laminated steel sheet used for shaping a can body can be almost discoidal, distorted discoidal, or elliptical, as well as discoidal.

In FIG. 1, 1 denotes a circular blank (blank sheet) before shaping, 2 denotes a straight wall of a can body (straight wall that has not yet been subjected to neck-in processing in Step D), 3 denotes a domed portion, 4 denotes a neck-in processed straight wall, and 5 denotes a tapered portion, i.e., a tapered wall after neck-in processing.

Referring to FIG. 1, first, the circular blank 1 is drawn (including DI processing) in one step or multiple steps to form a formed body having a bottom and having a predetermined radius (radius r; the radius of an outer surface of a can) (Step A). Next, the bottom of the formed body is shaped into a convex form to thereby form a domed portion 3 (Step B). Furthermore, an opening end portion of the formed body is trimmed (Step C). Next, the opening portion of the formed body is subjected to neck-in processing in one step or multiple steps in such a manner that the opening portion of the formed body has a predetermined radius (radius $r_1$; the radius of an outer surface of a can), thus forming a desired final formed body (two-piece can body). In FIG. 1, $R_0$ represents the radius of the circular blank 1 before shaping (for an elliptical blank, a mean value of the major axis and the minor axis); h, r, and $r_1$ represent the height, the maximum radius, and the minimum radius of the formed body during shaping or the final formed body, respectively. R denotes the radius of the circular sheet before shaping whose weight is the same as that of the final formed body. $R_0$ is equal to R calculated from the final formed body plus the trim length, and is suitably determined. However, since a trimmed portion is waste, it is industrially preferable to reduce the size of such a trimmed portion. Thus, $R_0$ is generally 10% or lower, and 20% at most, of R. In other words, $R_0$ is commonly 1 to 1.1 times, and 1 to 1.2 times at most, as large as R. More specifically, when the present invention is carried out, the timing of heat treatment in the middle stage can be determined using a value of $R=R_0/1.05$. Furthermore, in producing a plurality of can bodies, R can be determined by trial production.

More specifically, in Step A in production of a two-piece can body according to the present invention, the maximum radius r is equal to the minimum radius $r_1$, i.e., $r=r_1$. In Step D, the relationship of $r>r_1$ is established.

The radius R of a circular sheet before shaping whose weight is the same as that of a final formed body is determined on the basis of the measured weight of the final formed body. More specifically, the weight of the final formed body is measured, and then a dimension (radius) of the circular laminated steel sheet before shaping whose weight is the same as that of the final formed body is calculated. The dimension is defined as the radius R of the circular sheet before shaping whose weight is the same as that of the final formed body. While an end portion of the can body is trimmed in the method of producing the can body, the radius R of the circular sheet before shaping whose weight is the same as that of the final formed body is independent of influence of the trimming. Thus, the strain level can be evaluated more appropriately.

In a two-piece can produced by drawing (including DI processing) and neck-in processing of a circular resin-laminated steel sheet blank, a resin layer is stretched in a height direction and compressed in a circumferential direction. In a high strain level, the resin is largely deformed, resulting in breakage of the resin layer. The present invention utilizes, as an indicator of the strain level, not only a parameter $r_1/R$, which indicates the degree of compression, but also a parameter $h/(R-r)$, which relates to the stretching in the height direction so as to determine the indicator of the strain level. This is because, in the case of shaping a high strain level two-piece can body, the strain level must be expressed by not only the drawing ratio but also the degree of stretching. In other words, the degree of deformation of the resin layer is quantified by defining the strain level by both the degree of compression and the degree of stretching. Since the resin layer is likely to delaminate when the resin layer is stretched in the height direction and compressed in the circumferential direction, the degree of stretching in the height direction, as well as the degree of compression, is an important factor.

In the present invention, in terms of the strain level of the can body to be finally produced (final formed body), the height h, the maximum radius r, and the minimum radius $r_1$ of the final formed body are determined with consideration of the above results in such a manner as to satisfy the relationships of $0.1 \leq r_1/R \leq 0.25$ and $1.5 \leq h/(R-r) \leq 4$, wherein R represents the radius of the circular sheet before shaping whose weight is the same as that of the final formed body.

As described above, the present invention aims to produce a high strain can body with a laminated steel sheet, which has been difficult by known techniques. It has been difficult to produce a high strain can body that satisfies the parameter $r_1/R$, which defines the degree of compression, of 0.25 or lower and the parameter $h/(R-r)$, which defines the degree of stretching, of 1.5 or more simultaneously, with a laminated steel sheet by known techniques. Thus, in the present invention, $r_1/R$ was adjusted to 0.25 or lower and $h/(R-r)$ was adjusted to 1.5 or more, as the strain level of a two-piece can body intended by the present invention.

In contrast, when the strain level is high to give the parameter $r_1/R$ specifying the degree of compression not higher than 1.0 or the parameter $h/(R-r)$ specifying the degree of stretching exceeding 4, the number of forming stages is unnecessarily increased even though the shaping is possible, or the sheet stretching reaches the limit due to the progress of hardening, which causes a problem of sheet breakage. Therefore, the present invention specifies the strain level of producing a two-piece can intended by the present invention to $0.1 \leq r_1/R$ and $h/(R-r) \leq 4$.

When the above results are summarized, a two-piece can body intended by the present invention is a two-piece can body satisfying the following relationships of $r_1 \leq r$, $0.1 \leq r_1/R \leq 0.25$, and $1.5 \leq h/(R-r) \leq 4$, wherein h represents the height of the two-piece can body, r represents the maximum radius of the can body, $r_1$ represents the minimum radius of the can body, and R represents the radius of the circular sheet before shaping whose weight is the same as that of the final formed body.

The multistep shaping intended by the present invention includes any of drawing, DI processing, and neck-in processing, or a combination thereof. In the case of a process including neck-in processing, the dimension d of the final formed body meets $r>r_1$. In the case of a process including no neck-in processing, the dimension of the final formed body meets $r=r_1$ (r and $r_1$ represent the radii of the final formed body).

Subsequently, a base metal sheet used for the laminated steel sheet of the present invention will be described.

The base metal sheet for use in a laminated steel sheet according to the present invention is a steel sheet, which is lower in cost than aluminum and is economical. Examples of a preferable steel sheet include a common tin-free steel or a common tin plate. It is preferable for a tin-free steel to contain, for example, 50 to 200 mg/m² of a chromium metal layer and 3 to 30 mg/m², on a chromium metal basis, of chromium oxide layer on the surface. It is preferable for a tin plate to contain 0.5 to 15 g/m² of tin. The thickness of the steel sheet may be in, but is not limited to, the range of 0.15 to 0.30 mm. Furthermore, without any consideration of the cost, the present technique can be applied to an aluminum raw material.

Then, a resin layer of a laminated steel sheet of the present invention will be described.

The present inventors have examined the resin layer, and found that, in order to produce a high strain two-piece can body using a resin-laminated steel sheet, it is effective and promising to address the above-described problems to use a substance in which the orientation state of a polyester resin laminated on a steel sheet has been suppressed from its usual state. It has also been revealed that the orientation state of the resin largely depends on a resin composition and lamination conditions (temperatures, cooling conditions, etc., at the time of lamination). The present inventors control the orientation state by specifying a resin composition, i.e., a copolymer composition of a polyester resin, to suitable conditions.

When a high strain two-piece can body is shaped, a resin tends to orient in the can height direction due to compression deformation in the circumferential direction and stretching deformation in the height direction. As important properties required in a resin layer, it is preferable that it is difficult for orientation crystallization to proceed at the time of can shaping from the viewpoints of processability and adhesiveness, and, in contrast, it is preferable that crystallization proceed after a can body is produced from the viewpoints of durability and strength of a film. Thus, conflicting physical properties are desired.

As a resin used for a laminated steel sheet for a can body of a two-piece can, a copolymer resin containing polyethylene terephthalate as a main component is suitable from the viewpoints of strength, processability, and durability of a resin. However, since a polyethylene terephthalate resin is easy to crystallize by processing, orientation crystallization proceeds and degrades processability in the case where especially high processing is performed as in the present invention.

In general, orientation and crystallization are controlled by the amount of modification of a copolymer component. When the amount of copolymer components is small, orientation and crystallization are likely to proceed, and, in contrast, when the amount of copolymer components is large, it is difficult for orientation and crystallization to proceed.

However, in the present invention, strength and durability of a film are desired together with high strain processing. More specifically, a resin structure is desired in which it is difficult for orientation and crystallization to proceed during shaping of a can, and, in contrast, crystallization relatively easily occurs at the time of heat treatment before shaping of a can. The examination results have revealed that, in the resin structure, the orientation of a resin film in a laminated steel sheet is important. More specifically, even in, a resin which is difficult to crystallize, it is easy for crystallization to proceed in a resin having a higher degree of orientation and it is hard for crystallization to proceed in a resin having a lower degree of orientation. It has been revealed that, by appropriately controlling the proportion of a copolymer component of a polyester resin, i.e., a copolyethylene terephthalate resin and the orientation state in a laminated steel sheet, both of high strain processing and strength and durability of a film by heat treatment can be secured. It should be noted that the orientation of a resin is controlled by adjusting temperatures at the time of lamination, cooling conditions, etc. For example, a crystallization temperature tends to increase when a lamination temperature is high. The condition can be recognized by the peak position of a crystallization temperature of thermal analysis. The degree of orientation is high when the temperature is lower, and the degree of orientation is low when the temperature is higher.

Based on the above-described examination results, in the present invention, a copolyethylene terephthalate resin layer containing, as a copolymer component, at least one member selected from the group consisting of isophthalic acid and cyclohexane dimethanol in a range of 5 to 20 mol % and having a crystallization temperature of 120 to 140° C. is used as a resin layer forming a laminated steel sheet.

When the proportion of a copolymer component is lower than 5 mol %, orientation and crystallization at the time of processing are likely to proceed, and thus high strain molding becomes impossible. In contrast, when the proportion of a copolymer component exceeds 20 mol %, it is essentially hard for orientation and crystallization to occur. Thus, even after heat treatment, film strength and durability are low, and a film is softened, resulting in insufficient scratching resistance and chemical resistance. As a copolymer component, isophthalic acid or cyclohexane dimethanol is suitable because the strength and durability of a resin can be sufficiently secured by the addition itself. In particular, isophthalic acid is more preferable for contents in which especially smell and the like are important because a flavor is hardly absorbed.

As a polymer component of a balance, a substance is optimum which contains terephthalic acid and ethylene glycol as a main component except for ingredients intermixed during polymerization, such as diethylene glycol, and a slight amount of additives and containing terephthalic acid and ethylene glycol in a proportion of 90 mol % or more except for the above-mentioned copolymer components from the viewpoints of strength, processability, and durability of a resin.

With respect to the crystallization temperature, when the crystallization temperature is lower than 120° C., crystallization is very likely to occur, resulting in the formation of cracks and pinholes in the case of high strain processing. In contrast, when the crystallization temperature is higher than 140° C., a crystallization rate is very low, resulting in insufficient crystallization even by heat treatment at 150° C. or more, which deteriorates strength and durability of a film.

Furthermore, in order for a resin layer to follow high strain shaping of a two-piece can body intended by the present invention, it has been revealed that the plane orientation of a resin layer of a laminated steel sheet before forming is also important. More specifically, a film produced by biaxial orientation or the like is oriented in the orientation direction in the plane. When the orientation state maintains a high degree even after lamination, the film cannot follow processing, sometimes resulting in breakage. From such viewpoints, the plane orientation coefficient of a copolyethylene terephthalate resin is preferably 0.04 or lower. In order to produce such a laminated steel sheet using a biaxially oriented film with a high plane orientation coefficient, oriented crystals may be dissolved by sufficiently raising a temperature at the time of lamination. It is a matter of course that the orientation state of a resin is preferably in the state specified above.

Films produced by extrusion are almost non-oriented, and thus are suitable from the above-described viewpoints. Similarly, a direct laminating method involving directly laminating a molten resin to a steel sheet is preferable for the same reason.

It should be noted that the orientation state of a resin film can be evaluated usually by X-ray diffraction or by using a plane orientation coefficient. However, since the film of the present invention is in a state where there are few or no crystals, evaluation of the film of the present invention by X-ray diffraction is sometimes difficult. In contrast, even when it is attempted to evaluate the orientation of the film of the present invention using a plane orientation coefficient, the film of the present invention hardly changes due to orientation in an amorphous part compared with a crystal part. Therefore, the film of the present invention may be sometimes sufficiently evaluated even by using a plane orientation coefficient.

The present inventors have conducted extensive research on methods of evaluating orientation states. As a result, it has been revealed that there is a correlation between the crystallization temperature measured by thermal analysis and the orientation state and that when the temperature is higher, the orientation is damaged, and when the temperature is lower, the orientation remains. Accordingly, it is preferable that the orientation state of the resin film of the present invention be evaluated by using a crystallization temperature indicated by the peak observed by thermal analysis.

Then, a laminated steel sheet of the present invention will be described.

A laminated steel sheet of the present invention contains the above-mentioned copolyethylene terephthalate resin layer on at least one side of the above-mentioned metal sheet. A laminated steel sheet according to the present invention may contain an additive, such as a pigment, a lubricant, or a stabilizer, in the resin layer. A laminated steel sheet according to the present invention may contain a resin layer having another function in addition to the resin layer specified in the present invention as an upper layer or an intermediate layer between the resin layer specified in the present invention and the base steel sheet.

When the thickness of a resin layer increases, the internal stress sharply increases and delamination is likely to occur. However, in the resin layer specified in the present invention can be preferably used even for a thick resin layer. The resin thickness may be suitably determined according to a processing degree or other required properties. For example, a resin having a thickness of not less than 10 μm and not more than 50 μm can be preferably used. In a range of 20 μm or more in which the resin thickness is large, contribution of the effects of the present invention is large, and thus such a range is preferable.

There is no limitation on methods of laminating a resin to a steel sheet. Thermocompression methods in which a biaxially oriented film or a non-oriented film is thermocompressed and extrusion methods in which a resin layer is directly coated on the steel sheet using a T-die can be suitably selected. It has been confirmed that sufficient effects are obtained by any of the methods.

Then, a two-piece can body formed of the laminated steel sheet of the present invention will be described.

A two-piece can body of the present invention is obtained by processing a circular sheet formed of the above-described laminated steel sheet in multiple steps, and processing the circular sheet into a formed body in such a manner as to satisfy the following relationships of $r_1 \leq r$, $0.1 \leq r_1/R \leq 0.25$, and $1.5 \leq h/(R-r) \leq 4$, wherein h represents the height of the two-piece can body, r represents the maximum radius of the can body, $r_1$ represents the minimum radius of the can body, and R represents the radius of the laminated steel sheet having a circular shape before shaping whose weight is the same as that of the can body.

When the two-piece can body having a high strain level specified in the present invention is molded, adhesiveness is sometimes lowered depending on processing conditions or resin types. Therefore, it is preferable to secure required adhesiveness according to the application and specification of a can body. In this case, it is effective to perform heat treatment, in which a formed body is heated in such a manner that the temperature is in the range of 150° C. or higher and the melting point of the copolyethylene terephthalate or lower, at least one time along the way of shaping until a final formed body is obtained.

This heat treatment is intended to relieve internal stress caused by processing, and has effects of increasing adhesiveness by relieving the internal stress. More specifically, a high strain can body specified in the present invention is severely distorted in a resin layer, and tends to cause high internal stress. As a result, there is a possibility that a resin layer delaminates due to the internal stress serving as driving force. Then, by performing an appropriate heat treatment along the way of shaping as described above, the internal stress can be relieved to thereby suppress lowering in adhesiveness. Thus, such heat treatment is preferable. Moreover, orientation crystallization of a resin proceeds by performing the heat treatment to increase strength and durability of a resin layer. Thus, the conditions change depending on compositions and structures of a resin. Appropriate conditions may be determined based on performances, such as processability and durability, of a can.

When the heat treatment temperature is equal to or lower than the melting point of the copolyethylene terephthalate resin, it is easier to maintain an aesthetically pleasing appearance of a surface layer and to prevent a resin from adhering to other contactants. The lower limit of heat treatment temperature is determined with consideration of the efficiency of internal stress relaxation. More specifically, when the heat treatment temperature is equal to or higher than the glass transition point (Tg) of the copolyethylene terephthalate resin, internal stress relaxation easily progresses. From this point of view, the lower limit temperature is preferably 150° C. When processing time poses a problem and productivity is deteriorated, the lower limit temperature is preferably 170° C. or higher.

Moreover, when a high strain two-piece can body is formed, it is sometimes preferable that forming be further performed also after heat treatment. In such a case, it is preferable to determine the timing of heat treatment.

With respect to the timing of heat treatment, it is preferable to perform heat treatment in a stage of shaping at which h representing the height of a formed body in an intermediate stage, r representing the maximum radius of a formed body in an intermediate stage, and $r_1$ representing the minimum radius of a formed body in an intermediate stage satisfy the relationships of $r_1 \leq r$, $0.2 \leq r_1/R \leq 0.5$, and $1.5 \leq h/(R-r) \leq 2.5$ relative to the radius R at a position of a circular sheet before drawing, corresponding to an opening end part of a final formed body.

The reason why the timing of heat treatment is determined as described above resides in the fact that heat treatment is most effectively performed when a strain level is within the above-mentioned range. More specifically, heat treatment performed at a low strain stage leads to internal stress relaxation at a stage in which the internal stress of the resin is not high. Thus, the above-described effects are not sufficiently exhibited. When heat treatment is performed at an excessively high strain stage, the timing of heat treatment is sometimes late because adhesiveness of the resin decreases, resulting in possible occurrence of delamination. From such viewpoints, the upper limit and the lower limit of a strain level are determined as described above as an index of a preferable timing of heat treatment.

Heat treatment can be performed in either or both of Steps A and D of a production method shown in FIG. 1. The reason why a case where r and $r_1$ are the same is included with respect to the above-described timing of heat treatment resides in the fact that, in a method of producing a can including neck-in processing, a case where heat treatment is performed in Step A is sometimes included or, in a method of producing a can including no neck-in processing, r and $r_1$ are the same in diameter. Heat treatment may be performed a plurality of times according to the necessity of internal stress relaxation until a final formed body is obtained by shaping.

There is no limitation on heat treatment methods. It is confirmed that the same effect is obtained with an electric furnace, a gas oven, an infrared oven, an induction heater, etc. Moreover, a heating rate, a heating time, and a cooling time may be suitably determined with consideration of both of plus effects due to internal stress relaxation and minus effects due to orientation crystallization. Usually, a higher heating rate is more efficient and a heating time is about 15 seconds to about 60 seconds as a standard, but the heating rate and the heating time are not limited to these ranges. A higher cooling rate is preferable because development of spherulite is easy to avoid.

EXAMPLES

Hereinafter, examples of the present invention will be described.

[Production of Laminated Steel Sheet]

A 0.20 mm thick T4CA tin-free steel (metal Cr layer: 120 mg/m$^2$, Cr oxide layer: 10 mg/m$^2$ in terms of metal Cr) was used as a base sheet. Onto the base sheet, various kinds of resin layers were formed using a film-lamination method (film thermocompression) or a direct-lamination method (direct extrusion). As a resin film, rein pellets produced by Kanebo Synthetic Fiber Co., Ltd. and Eastman Chemical Company were used. Resins are suitably mixed in such a manner as to have compositions shown in Table 1 to thereby produce a single-layer non-oriented film or biaxially oriented film by a usual method. As a film laminate, each film having a thickness of 25 μm was laminated on each side of the original sheet to thereby produce a laminated steel sheet.

Film Thermocompression 1:

A film produced by a biaxial orientation method was thermo-compressed on a steel sheet which had been heated to ±10° of the melting point of a resin using a nip roll, and then was water cooled within 7 seconds by water.

Film Thermocompression 2:

A non-oriented film was thermo-compressed on a steel sheet which had been heated to ±10° C. of the melting point of a resin using a nip roll, and then was water cooled within 7 seconds.

Direct Extrusion:

Resin pellets were kneaded and melted in an extruder. Then the resultant was extruded through a T-die to laminate onto a running steel sheet. The resin-laminated steel sheet was nip-cooled on a cooling roll at 80° C., and was further water cooled.

The crystallization temperature and the plane orientation coefficient of the laminate film on thus prepared laminated steel sheet were determined by the following procedures. The obtained results are shown in Table 1.

[Measurement of Crystallization Temperature]

Using a differential scanning calorimeter (DSC), a temperature was increased from 0° C. to 280° C. at a rate of 10° C./min. The peak temperature (crystallization temperature) of the exothermic peak observed in the range of 100° C. to 200° C. was measured, and the orientation state was evaluated.

[Determination of Plane Orientation Coefficient]

Abbe's refractometer was used to determine the refractive index under the condition of: light source of sodium D ray; intermediate liquid of methylene iodide; and temperature of 25° C. The determined refractive indexes were Nx in the machine direction, Ny in the transverse direction, and Nz in the thickness direction of the film. Then, the plane orientation coefficient Zs was calculated by the following formula:

Plane orientation coefficient($Ns$)=($Nx+Ny$)/2−$Nz$

[Can Shaping]

A two-piece can body (final formed body) was produced by the following procedures according to the production method shown in FIG. 1 using the various laminated steel sheets obtained above. It should be noted that shaping of the intermediate formed body (Step C) and the shaping of the final formed body (Step D) were performed at strain levels to obtain forms shown in Table 2. Drawing in Step A was performed in 5 steps, and neck-in processing in Step D was performed in 7 steps. Heat treatment was performed at an intermediate step during Steps A to D. A can body was heated using an infrared heating furnace, and was water cooled after termination of heat treatment. The timing (strain level of the can body at the timing of performing heat treatment) and heat treatment conditions of heat treatment are shown in Table 3.

Can Shaping Procedure

1) Blanking (Diameter of blank sheet: 66 to 9.4 mmφ)
2) Drawing and ironing (Step A)

Through the five steps of drawing, can bodies (intermediate formed bodies) having a radius r and a height h of the can in a range of r/R from 0.18 to 0.55 and of h/(R−r) from 0.15 to 3.00, were produced. In order to produce desired can bodies, ironing was also applied in combination as required.

3) Forming of dome-shape at can bottom (Step B)

Bulging was applied to the can bottom to form a hemispherical shape 6 mm in depth.

4) Trimming (Step C)

The can top end portion was trimmed by about 2 mm.

5) Diametral reduction at opening portion of cylinder (Step D)

Diametral reduction was given to the upper part of the cylinder. Specifically, the diametral reduction was conducted by a die-neck method in which the opening end was pressed against a die in an inside-tapered shape to thereby produce can bodies having final can shapes given in Table 2.

In Table 2, h, r, $r_1$, ha, hc, and R of the final formed body (Step D) represent a height to an opening end of the final formed body, a radius of a can body, a radius of a neck formed part, a height of the can body, a height of the neck formed part, and a radius of a circular blank before shaping whose weight is the same as that of the final formed body, respectively. The radius R of the circular sheet blank was determined as follows. The weight of a blank sheet before shaping and the weight of a final formed body after trimming were measured. Based on the measurement results, the radius of the blank sheet before shaping whose weight is the same as that of the final formed body was determined. Then, the determined radius was defined as the radius R of the circular sheet blank before shaping whose weight was the same as that of the final formed body.

For the can bodies produced by the above procedure, evaluation was given in terms of the processability and corrosion resistance of the resin layer of the can body.

The results of the evaluation are also shown in Table 3.

[Film Processability Test]

(1) Adhesion Test

The can body was sheared in a substantially rectangular shape in the can height direction in such a manner that the width in the circumferential direction was 15 mm. Only the steel sheet was sheared linearly in the circumferential direction at a position 10 mm from the bottom in the can height direction. As a result, there was prepared a test piece having a 10 mm portion in the can height direction toward the can bottom and a residual portion with the boundary of the sheared position. At the 10 mm portion, a steel sheet having 15 mm in width and 60 mm in length was joined (welded). Then, the 60 mm steel sheet portion was clamped to forcefully separate the film on the residual portion by about 10 mm from the sheared position. A peeling test was conducted in 180° direction with the clamping areas of the film-separated portion and the 60 mm steel sheet portion. The minimum peeling strength among the observed values was adopted as the index of adhesion.

(Evaluation)

Lower than 4N/15 mm: x

Not less than 4N/15 mm and lower than 6N/15 mm: ◯

6N/15 mm or more: ⊚

(2) Evaluation of Film Defects

Centering on a position 10 mm from the can upper end, a seal on which a 15 mmφ small aperture was opened was stuck in such a manner that a measurement area was 15 mmφ. Next, the aperture part was dipped in an electrolyte (KCl: 5% solution, temperature: normal temperature), and a voltage of 6.2 V was applied to between the steel sheet and the electrolyte. According to the current value measured at this time, evaluation was performed as follows.

(Evaluation)
More than 0.01 mA: x
More than 0.001 mA and 0.01 mA or lower: Δ
More than 0.0001 mA and 0.001 mA or lower: ○
0.0001 mA or lower: ◎

[Evaluation of Corrosion Resistance]

A can body surface film was scratched with a file in such a manner that the steel sheet of the can body can be energized. An electrolyte (1% NaCl solution, temperature of 25° C.) was poured into the can to reach the can spout. Thereafter, a voltage of 6.2 V was applied to between the can body and the electrolyte. According to the current value measured at this time, evaluation was performed as follows.

[Current value]
More than 1 mA: x
More than 0.01 mA and 0.1 mA or lower: Δ
More than 0.001 mA and 0.01 mA or lower: ○
0.001 mA or lower: ◎

As is clear from Table 3, the can bodies C1 to C28, which are examples of the present invention, exhibited favorable values both in terms of film processability and corrosion resistance.

In contrast, C29 to C33, which are comparative examples, crystallization temperatures are outside the range of the present invention. Moreover, the content of copolymer components is outside the range of the present invention in some comparative examples, and thus the corrosion resistance is poor. Further, in some comparative examples, the film processability is poor in addition to the corrosion resistance.

As described above, it is revealed that, even in the case of a two-piece can having a high strain level, such as an aerosol two-piece can, the present invention tends to be free from delamination and breakage of a film, to excel in recovery properties of adhesiveness when heat treatment was performed after processing, and to excel in the film adhesiveness as a can. Therefore, by the use of the laminated steel sheet of the present invention as a raw material, a two-piece can body can be obtained which has a high strain level and is free from delamination and breakage of a film.

TABLE 1

| Testing steel sheet No. | Copolyethylene terephthalate resin | | | | | | | |
|---|---|---|---|---|---|---|---|---|
| | Resin composition | Copolymer component content (mol %) | Melting point (° C.) | Lamination method | Lamination temperature (° C.) | Crystallization temperature (° C.) | Plane orientation coefficient | Remarks |
| A1 | 6% isophtaric acid-copolyethylene terephthalate | 6 | 242 | Film thermo-compression 2 | 220 | 136 | <0.01 | Present invention example |
| A2 | 12% isophtaric acid-copolyethylene terephthalate | 12 | 226 | Film thermo-compression 1 | 230 | 133 | <0.01 | Present invention example |
| A3 | 12% isophtaric acid-copolyethylene terephthalate | 12 | 226 | Film thermo-compression 1 | 226 | 128 | <0.01 | Present invention example |
| A4 | 12% isophtaric acid-copolyethylene terephthalate | 12 | 226 | Film thermo-compression 1 | 222 | 123 | 0.01 | Present invention example |
| A5 | 12% isophtaric acid-copolyethylene terephthalate | 12 | 226 | Film thermo-compression 1 | 220 | 121 | 0.03 | Present invention example |
| A6 | 12% isophtaric acid-copolyethylene terephthalate | 12 | 228 | Direct extrusion | 220 | 125 | <0.01 | Present invention example |
| A7 | 18% isophtaric acid-copolyethylene terephthalate | 18 | 210 | Film thermo-compression 1 | 210 | 138 | <0.01 | Present invention example |
| A8 | 6% cyclohexane dimethanol-copolyethylene terephthalate | 6 | 245 | Film thermo-compression 1 | 245 | 139 | <0.01 | Present invention example |
| A9 | 12% cyclohexane dimethanol-copolyethylene terephthalate | 12 | 240 | Film thermo-compression 1 | 237 | 137 | 0.01 | Present invention example |
| A10 | 3% cyclohexane dimethanol-copolyethylene terephthalate | 3 | 250 | Film thermo-compression 2 | 250 | 116 | <0.01 | Comparative example |
| A11 | 22% cyclohexane dimethanol-copolyethylene terephthalate | 22 | 208 | Film thermo-compression 1 | 208 | 155 | <0.01 | Comparative example |
| A12 | 12% cyclohexane dimethanol-copolyethylene terephthalate | 12 | 226 | Film thermo-compression 1 | 215 | 118 | 0.06 | Comparative example |
| A13 | 12% cyclohexane dimethanol-copolyethylene terephthalate | 12 | 228 | Film thermo-compression 2 | 210 | 145 | <0.01 | Comparative example |

TABLE 2

| | | Intermediate formed body (Step C) | | Final formed body (Step D) | | | | | | | | |
|---|---|---|---|---|---|---|---|---|---|---|---|---|
| Can shape | Blank diameter $R_0$ (mm) | r (mm) | h (mm) | r (mm) | $r_1$ (mm) | h (mm) | ha (mm) | hc (mm) | Blank diameter R* (mm) | $r_1$/R (mm) | h/(R-r) (mm) | Change in sheet thickness** |
| B1 | 41.0 | 11.0 | 63.6 | 11.0 | 7.8 | 65.9 | 47.0 | 9.9 | 40.4 | 0.19 | 2.24 | 1.20 |
| B2 | 47.0 | 11.0 | 63.5 | 11.0 | 7.8 | 65.9 | 47.0 | 9.9 | 46.6 | 0.17 | 1.85 | 1.45 |
| B3 | 35.5 | 11.0 | 63.5 | 11.0 | 7.8 | 65.9 | 47.0 | 9.9 | 34.8 | 0.22 | 2.77 | 0.75 |
| B4 | 33.0 | 11.0 | 63.5 | 11.0 | 7.8 | 65.9 | 47.0 | 9.9 | 32.2 | 0.24 | 3.11 | 0.65 |

*The blank diameter R is a blank diameter converted in terms of the weight of a final formed body.
**Sheet thickness of a part having the minimum sheet thickness of a can body/Blank sheet thickness (All thicknesses refer to a steel sheet thickness)

TABLE 3

| Can body No. | Testing steel sheet No. | Melting point of resin layer (°C.) | Strain level at heat treatment r₁/R | Strain level at heat treatment h/(R-r) | Heat treatment condition Temperature (°C.) | Heat treatment condition Time (second) | Final can body shape | Film processability Adhesion | Film defect | Corrosion resistance | Remarks |
|---|---|---|---|---|---|---|---|---|---|---|---|
| C1 | A3 | 226 | 0.27 | 2.16 | 210 | 30 | B1 | ○ | ◎ | ◎ | Present invention example |
| C2 | A3 | 226 | 0.27 | 2.16 | 210 | 60 | B1 | ○ | ◎ | ◎ | Present invention example |
| C3 | A3 | 226 | 0.27 | 2.16 | 210 | 90 | B1 | ◎ | ◎ | ◎ | Present invention example |
| C4 | A3 | 226 | 0.27 | 2.16 | 210 | 120 | B1 | ◎ | ◎ | ○ | Present invention example |
| C5 | A3 | 226 | 0.27 | 2.16 | 230 | 60 | B1 | ◎ | ◎ | ○ | Present invention example |
| C6 | A3 | 226 | 0.27 | 2.16 | 240 | 30 | B1 | ◎ | ○ | ○ | Present invention example |
| C7 | A3 | 226 | 0.27 | 2.16 | 160 | 90 | B1 | ○ | ◎ | ◎ | Present invention example |
| C8 | A3 | 226 | 0.27 | 2.16 | 120 | 60 | B1 | ○ | ○ | ○ | Present invention example |
| C10 | A3 | 226 | 0.38 | 1.78 | 210 | 30 | B1 | ○ | ○ | ◎ | Present invention example |
| C11 | A3 | 226 | 0.47 | 1.53 | 210 | 30 | B1 | ○ | ○ | ○ | Present invention example |
| C12 | A3 | 226 | 0.24 | 1.78 | 210 | 30 | B2 | ◎ | ◎ | ◎ | Present invention example |
| C13 | A3 | 226 | 0.18 | 2.24 | 210 | 30 | B2 | ○ | ○ | ◎ | Present invention example |
| C14 | A3 | 226 | 0.32 | 2.67 | 210 | 30 | B3 | ○ | ◎ | ○ | Present invention example |
| C15 | A3 | 226 | 0.50 | 2.30 | 210 | 30 | B3 | ○ | ○ | ◎ | Present invention example |
| C16 | A3 | 226 | 0.50 | 0.15 | 210 | 30 | B3 | ○ | ○ | ○ | Present invention example |
| C17 | A3 | 226 | 0.34 | 3.00 | 210 | 30 | B4 | ○ | ◎ | ○ | Present invention example |
| C18 | A3 | 226 | 0.40 | 2.30 | 210 | 30 | B4 | ○ | ◎ | ◎ | Present invention example |
| C19 | A3 | 226 | 0.55 | 2.00 | 210 | 30 | B4 | ○ | ○ | ○ | Present invention example |
| C20 | A1 | 242 | 0.27 | 2.16 | 220 | 30 | B1 | ○ | ◎ | ◎ | Present invention example |
| C21 | A2 | 226 | 0.27 | 2.16 | 210 | 30 | B1 | ◎ | ◎ | ◎ | Present invention example |
| C22 | A4 | 226 | 0.27 | 2.16 | 210 | 30 | B1 | ○ | ◎ | ◎ | Present invention example |
| C23 | A5 | 226 | 0.27 | 2.16 | 210 | 30 | B1 | ○ | ○ | ◎ | Present invention example |
| C24 | A6 | 228 | 0.27 | 2.16 | 210 | 30 | B1 | ○ | ◎ | ◎ | Present invention example |
| C26 | A7 | 210 | 0.27 | 2.16 | 220 | 30 | B1 | ◎ | ◎ | ○ | Present invention example |
| C27 | A8 | 245 | 0.27 | 2.16 | 220 | 30 | B1 | ○ | ◎ | ○ | Present invention example |
| C25 | A8 | 245 | 0.27 | 2.16 | 150 | 60 | B1 | ○ | ○ | ○ | Present invention example |
| C28 | A9 | 240 | 0.27 | 2.16 | 220 | 30 | B1 | ○ | ◎ | ○ | Present invention example |
| C29 | A10 | 250 | 0.27 | 2.16 | 235 | 30 | B1 | ○ | △ | △ | Comparative example |
| C31 | A11 | 208 | 0.27 | 2.16 | 200 | 30 | B1 | ◎ | ○ | △ | Comparative example |
| C32 | A12 | 226 | 0.27 | 2.16 | 210 | 30 | B1 | X | △ | X | Comparative example |
| C33 | A13 | 228 | 0.27 | 2.16 | 210 | 30 | B1 | ◎ | ○ | △ | Comparative example |

INDUSTRIAL APPLICABILITY

According to the present invention, by forming using the laminated steel sheet of the present invention, a two-piece can body can be obtained which has a high strain level and is free from delamination and breakage of a film. Therefore, the present invention is preferably used for a can having a high drawing level, such as an aerosol can.

The invention claimed is:
1. A method of producing a can body of a two-piece can, comprising:

(a) providing a laminated steel sheet comprising a steel sheet and
a copolyethylene terephthalate resin layer containing at least one member selected from the group consisting of isophthalic acid and cyclohexane dimethanol as a copolymer component in a proportion of 5 to 20 mol %, and having a crystallization temperature of 120° C. to 140° C. on at least one side of the steel sheet; and
(b) shaping, in multiple steps, a circular sheet of the laminated steel sheet into a formed body, which satisfies the following relationships:
$r_1 \leq r$, $0.1 \leq r_1/R \leq 0.25$, and $1.5 \leq h/(R-r) \leq 4$, wherein $r_1$ represents the minimum radius of the can body, r represents the maximum radius of the can body, h represents the height of the can body, and R represents the radius of the laminated steel sheet having a circular shape before shaping whose weight is the same as that of the can body.

2. The method according to claim 1, further comprising heating a formed body obtained from the middle of the multiple steps at least once at a temperature ranging from 150° C. or higher to a melting point of the copolyethylene terephthalate resin or lower.

3. The method according to claim 2, wherein, the heating is performed when the formed body obtained in the middle of the multiple steps satisfies the following relationships:
$r_1 \leq r$, $0.2 \leq r_1/R \leq 0.5$, and $1.5 \leq h/(R-r) \leq 2.5$, wherein $r_1$ represents the minimum radius of the can body, r represents the maximum radius of the can body, h represents the height of the can body, and R represents the radius of the laminated steel sheet having a circular shape before shaping whose weight is the same as that of the can body.

4. The method according to claim 1, wherein the providing step (a) includes heating the steel sheet and laminating the copolyethylene terephthalate resin layer on the at least one side of the steel sheet that is heated, which is directly followed by a cooling of the steel sheet to complete a formation of the copolyethylene terephthalate resin layer having the crystallization temperature of 120° C. to 140° C.

5. A can body of a two-piece can, which is produced by the method according to claim 1.

6. A can body of a two-piece can, which is produced by the method according to claim 2.

7. A can body of a two-piece can, which is produced by the method according to claim 3.

8. A can body for a two-piece can made of a laminated steel sheet comprising a steel sheet and a copolyethylene terephthalate resin layer containing at least one member selected from the group consisting of isophthalic acid and cyclohexane dimethanol as a copolymer component in a proportion of 5 to 20 mol %, and having a crystallization temperature of 120° C. to 140° C. on at least one side of the steel sheet, the copolyethylene terephthalate resin having a plane orientation coefficient of 0.04 or lower;
wherein the following relationships are satisfied:
$r_1 \leq r$, $0.1 \leq r_1/R \leq 0.25$, and $1.5 \leq h/(R-r)$ 4, wherein $r_1$ represents the minimum radius of the can body, r represents the maximum radius of the can body, h represents the height of the can body, and R represents the radius of the laminated steel sheet having a circular shape before shaping whose weight is the same as that of the can body.

9. A can body for a two-piece can made of a laminated steel comprising a steel sheet and a polyester resin layer on at least one side of the steel sheet,
the polyester resin layer comprising terephthalic acid and ethylene glycol as a main polymer component and at least one member of isophthalic acid and cyclohexane dimethanol as a copolymer component in a proportion of 5 to 20 mol %, and having a crystallization temperature of 120° C. to 140° C., the polyester resin having a plane orientation coefficient of 0.04 or less,
the laminated steel sheet satisfying the following relationships:
$r_1 \leq r$, $0.1 \leq r_1/R \leq 0.25$, and $1.5 \leq h/(R-r) \leq 4$, wherein $r_1$ represents the minimum radius of the can body, r represents the maximum radius of the can body, h represents the height of the can body, and R represents the radius of the laminated steel sheet having a circular shape before shaping whose weight is the same as that of the can body.

* * * * *

UNITED STATES PATENT AND TRADEMARK OFFICE
CERTIFICATE OF CORRECTION

PATENT NO. : 8,727,155 B2
APPLICATION NO. : 13/723957
DATED : May 20, 2014
INVENTOR(S) : Yasuhide Oshima et al.

It is certified that error appears in the above-identified patent and that said Letters Patent is hereby corrected as shown below:

On the Title page; Item (57) Abstract, line 8:

delete "hyone" and insert --one--.

In the Specification

Column 1, Line 11:

delete "2009," and insert --2009 (abandoned),--.

In the Claims

Column 18, Claim 8, Line 15:

delete "(R-r) 4," and insert --(R-r)$\leq$4--.

Signed and Sealed this
Thirty-first Day of March, 2015

Michelle K. Lee
*Director of the United States Patent and Trademark Office*